United States Patent

Itoh et al.

[11] Patent Number: 5,942,591
[45] Date of Patent: Aug. 24, 1999

[54] CURABLE SILICONE RELEASE COMPOSITION AND RELEASE SHEET

[75] Inventors: Hideyuki Itoh; Toshio Ohba; Kenichi Isobe; Shinji Irifune; Takamasa Toyoda, all of Usui-gun, Japan

[73] Assignee: Shin-Etsu Chemical Co., Ltd., Japan

[21] Appl. No.: 08/879,053

[22] Filed: Jun. 19, 1997

[30] Foreign Application Priority Data

Jul. 11, 1995 [JP] Japan .................................. 7-198120
Jun. 20, 1996 [JP] Japan .................................. 8-180038

[51] Int. Cl.$^6$ .................................................. C08G 77/08
[52] U.S. Cl. ............................ 528/15; 525/478; 525/479
[58] Field of Search .............................. 528/15; 525/478, 525/479

[56] References Cited

U.S. PATENT DOCUMENTS

| | | | |
|---|---|---|---|
| 4,374,967 | 2/1983 | Brown et al. .............................. | 528/31 |
| 4,386,135 | 5/1983 | Campbell et al. .......................... | 528/15 |
| 4,772,515 | 9/1988 | Hara et al. . | |

OTHER PUBLICATIONS

Abstract of JP 63–251465.
Abstract of JP 91–019267.

*Primary Examiner*—Melvyn I. Marquis
*Attorney, Agent, or Firm*—Millen, White, Zelano & Branigan, P.C.

[57] ABSTRACT

A solventless curable silicone release composition contains (A) a branched organopolysiloxane having a vinyl group attached to a silicon atom at an end of its molecular chain, (B) an organohydrogenpolysiloxane having at least three SiH groups in a molecule, and (C) a platinum group metal catalyst. The composition is easily applicable to a thin gage and cures into a releasable silicone coating ensuring light release at high speeds. A release sheet having the cured coating formed thereon has improved release characteristics.

14 Claims, No Drawings

CURABLE SILICONE RELEASE COMPOSITION AND RELEASE SHEET

BACKGROUND OF THE INVENTION

1. Field of the Invention

This invention relates to a curable silicone release composition and a release sheet having a cured coating of the composition formed thereon.

2. Prior Art

For the purpose of preventing the adhesion or bond between substrates such as paper sheets and plastic films and tacky materials, it has been a common practice to form cured coatings of silicone composition on the substrate surface to impart release properties thereto. Known methods for forming silicone coatings on the substrate surface include (i) a method of effecting addition reaction between an organopolysiloxane having an aliphatic unsaturated group and an organohydrogenpolysiloxane in the presence of a platinum compound catalyst to form a releasable coating and (ii) a method of effecting condensation of an organopolysiloxane in the presence of an organic acid metal salt catalyst such as organic tin compounds to form a releasable coating.

With respect to release properties, such silicone coatings are generally required to ensure light release at low speeds. Silicone coatings allowing for light release at high speeds are also needed in order to accommodate high speed rewinding and high speed label debris removal. A demand for the solventless type is now increasing from the standpoints of safety and hygiene.

Of the above-mentioned methods, the method that can produce cured silicone coatings featuring improved cure and light release at high speeds is the method (i) of effecting addition reaction between an organopolysiloxane having an aliphatic unsaturated group and an organohydrogenpolysiloxane. Included in the organopolysiloxane having an aliphatic unsaturated group are chain siloxanes of the following general formula, for example.

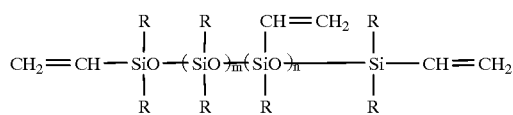

Such chain siloxanes, however, are unsuccessful in providing light release at either low or high speeds.

In JP-A 251465/1988 and JP-B 19267/1991, compositions comprising an aliphatic unsaturated group-bearing organopolysiloxane containing $RSiO_{3/2}$ units are disclosed as achieving light release at high speeds and improving curing properties.

The aliphatic unsaturated group-bearing organopolysiloxane used in these compositions contains two or more $RSiO_{3/2}$ units. Such compounds containing a plurality of $RSiO_{3/2}$ units in a molecule become predominant of three-dimensional structure and have the problems of difficult control of their molecule, a widely varying viscosity at the end of preparation, and a short pot life. From the view point of flow, these compounds are no longer Newtonian fluids. It is then difficult to apply such a compound in a solventless system to form a thin coating although the coating must be as thin as 1 μm or less in order to be effective for the release treatment of plastic films and paper sheets.

SUMMARY OF THE INVENTION

An object of the invention is to provide a solventless silicone release composition of the addition reaction type which is effectively applicable to a thin gage and cures into a releasable silicone coating ensuring light release at high speeds.

Focusing at the vinyl-containing organopolysiloxane used as a primary component in such a silicone release composition, we have found that light release at high speeds can be accomplished by using a branched organopolysiloxane of the following formula (1) having only one branched structure introduced into its molecule and a vinyl group attached to only a highly reactive end of its molecular chain.

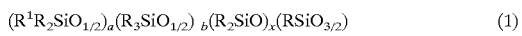

In formula (1), $R^1$ is a vinyl group, R is independently a monovalent hydrocarbon group free of an aliphatic unsaturated bond, letters a and b are numbers satisfying $1.5 \leq a \leq 3.0$, $0 \leq b \leq 1.5$, a+b=3, and x is a number within the range: $50 \leq x \leq 400$.

We have also found that light release at low speeds can be accomplished by using an organopolysiloxane obtained by replacing some of the vinyl groups in the branched organopolysiloxane of formula (1) by another substituent so as to reduce the content of vinyl group as a whole. This organopolysiloxane is prevented from short curing as compared with conventional linear organopolysiloxanes having an identical vinyl content. There is obtained a solventless addition reaction type silicone composition which is applied and cured to form a thin silicone coating capable of light release at low and high speeds.

According to the invention, there is provided an organic solventless curable silicone release composition comprising as essential components (A) 100 parts by weight of a branched organopolysiloxane of formula (1) having a vinyl group attached to a silicon atom at an end of its molecular chain, (B) 0.5 to 10 parts by weight of an organohydrogenpolysiloxane having at least three hydrogen atoms each attached to a silicon atom in a molecule, and (C) a catalytic amount of a platinum group metal catalyst.

Also contemplated herein is a release sheet having formed thereon a cured coating of the composition.

DESCRIPTION OF THE PREFERRED EMBODIMENT

Component (A) of the curable silicone release composition according to the invention is a branched organopolysiloxane of the following formula (1).

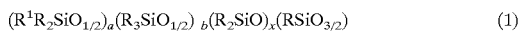

In formula (1), $R^1$ is a vinyl group. R is independently a monovalent hydrocarbon group free of an aliphatic unsaturated bond. The groups represented by R may be the same or different. The hydrocarbon groups preferably have 1 to 10 carbon atoms, more preferably 1 to 8 carbon atoms. Examples include alkyl groups such as methyl, ethyl and propyl, aryl groups such as phenyl and tolyl, and halogen-substituted alkyl groups such as 3,3,3-trifluoro-propyl. It is preferred from the standpoints of cure and release properties that more than 80 mol % of the R groups are methyl. Letters a and b are numbers satisfying $1.5 \leq a \leq 3.0$, $0 \leq b \leq 1.5$, a+b=3, and x is a number within the range: $50 \leq x \leq 400$.

Preferred examples of formula (1) wherein a=3.0 and b=0 are organopolysiloxanes of the following formula (1a):

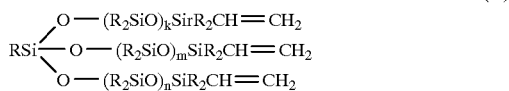

$$\text{RSi} \begin{cases} \text{O} - (R_2SiO)_k SiR_2CH=CH_2 \\ \text{O} - (R_2SiO)_m SiR_2CH=CH_2 \\ \text{O} - (R_2SiO)_n SiR_2CH=CH_2 \end{cases} \quad (Ia)$$

wherein R is as defined above, letters k, m and n are 0 or positive integers satisfying k+m+n=x, that is, $50 \leq k+m+n \leq 400$.

The organopolysiloxane (A) has one $RSiO_{3/2}$ unit in a molecule. Organopolysiloxanes having more than one $RSiO_{3/2}$ unit in a molecule are difficult to synthesize and compositions containing the same are less stable (short pot life) and difficult to apply. The organopolysiloxane's molecular chain has three ends. The organopolysiloxane of formula (1a) which has one vinyl group attached to a silicon atom at each of the three molecular chain ends is advantageously used because it ensures light release at high speeds. Further, those organopolysiloxanes in which among the three molecular chain ends, 1.5 to 2.7 ends on the average have a vinyl group attached to a silicon atom (inversely, 0.3 to 1.5 molecular chain ends on the average do not have a vinyl group attached to a silicon atom) are more advantageously used when light release at both low and high speeds is desired. More particularly, in the organopolysiloxane of formula (1), the low-speed release becomes lighter as b increases. If the number of molecular chain ends free of a vinyl group attached to a silicon atom is less than 0.3 on the average among the three molecular chain ends (that is, b<0.3), the low-speed release would not be sufficiently light. Inversely, if the same number exceeds 1.5 (that is, b>1.5), there would occur losses of cure and percent retention of adhesion.

The organopolysiloxane (A) should preferably have a viscosity of 50 to 2,000 centipoise at 25° C. Organopolysiloxanes with a viscosity of less than 50 cp at 25° C. would penetrate too much into the substrate. Organopolysiloxanes with a viscosity of higher than 2,000 cp at 25° C. would fail to achieve one of the objects, light release at high speeds and be difficult to apply. For this reason, the degree of polymerization (x) is in the range of 50 to 400.

The organopolysiloxane (A) can be synthesized by a conventional process, for example, by blending siloxane oligomers and a cyclic siloxane as represented by the following structural formulae in any desired ratio and effecting polymerization in the presence of an alkali catalyst such as KOH.

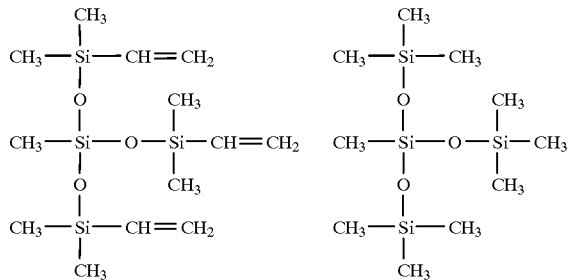 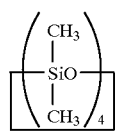

Component (B) is an organohydrogenpolysiloxane having at least three hydrogen atoms each attached to a silicon atom, that is, at least three SiH groups in a molecule. These SiH groups undergo addition reaction with vinyl groups in component (A) to form a cured coating. Specifically, the organohydrogenpolysiloxane is of the following formula (2):

$$R^2_c H_d SiO_{(4-c-d)/2} \quad (2)$$

wherein $R^2$ is a substituted or unsubstituted monovalent hydrocarbon group, letters c and d are positive numbers satisfying $c+d \leq 3$.

Like R defined above, the hydrocarbon groups represented by $R^2$ are preferably those groups of 1 to 10 carbon atoms, especially 1 to 8 carbon atoms, free of an aliphatic unsaturated bond. Examples include alkyl groups such as methyl, ethyl and propyl, aryl groups such as phenyl and tolyl, and halogen-substituted alkyl groups such as 3,3,3-trifluoropropyl. Methyl is preferred for an increased addition reaction rate.

Exemplary polysiloxanes of this type are homopolymers and copolymers comprising a $(CH_3)HSiO_{2/2}$ unit, $HSiO_{3/2}$ unit, $(CH_3)_2SiO_{2/2}$ unit, $(CH_3)_2HSiO_{1/2}$ unit, $(CH_3)SiO_{3/2}$ unit and/or $(CH_3)_3SiO_{1/2}$ unit. They may be either linear or cyclic and should preferably have a viscosity of 5 to 500 centipoise at 25° C.

The amount of component (B) blended is determined in accordance with the content of vinyl group in component (A). Most often, 0.5 to 10 parts by weight of component (B) is blended per 100 parts by weight of component (A) when formation of cured coatings and release properties thereof are considered.

Component (C) is a platinum group metal catalyst for catalyzing addition reaction between components (A) and (B). Any of well-known addition reaction catalysts may be used. Exemplary platinum group metal catalysts include platinum, palladium and rhodium catalysts, with the platinum catalysts being preferred. Exemplary of the platinum catalyst are chloroplatinic acid, alcohol and aldehyde solutions of chloroplatinic acid, and complexes of chloroplatinic acid with olefins and vinylsiloxanes.

The platinum group metal catalyst is added in a catalytic amount. For obtaining good cured coatings and from the economical aspect, the catalyst is added in an amount to provide 1 to 1,000 parts by weight of platinum group metal per million parts by weight of component (A).

In the practice of the invention, the composition is prepared by blending predetermined amounts of components (A) to (C). In addition to these essential components, various additives are added if desired. Such optional additives include activity inhibitors for suppressing the catalytic activity of the platinum group metal catalyst, such as organic nitrogen compounds, organic phosphorus compounds, acetylene compounds, oxime compounds and organic chlorine compounds; and silicone resins and diorganopolysiloxanes free of a hydrogen atom attached to a silicon atom or a vinyl group for controlling peel force. These optional components are added in conventional amounts insofar as the objects of the invention are not impaired.

The preferred method for preparing the silicone release composition of the invention is by mixing components (A) and (B) and optional components until uniform and then adding component (C) to the mixture. For each component, appropriate materials may be used alone or in admixture of two or more.

The thus obtained silicone release composition is applied to a substrate such as paper and plastic film and heat cured in a conventional manner. The substrate having a cured coating of the composition formed thereon is useful as release paper or release sheet.

There has been described a silicone release composition which is easily applicable to form a thin coating despite the solventless system and cures into a releasable silicone coating ensuring light release at high speeds. Particularly when free siloxane segments whose molecular chain end is not fixed are present, the cured silicone coating ensures light release at both low and high speeds and causes a minimized loss of retention of adhesion. The composition exhibits improved performance as a release agent. A release sheet having the cured coating formed thereon has improved release characteristics.

EXAMPLE

Examples of the present invention are given below by way of illustration and not by way of limitation. All parts are by weight, and the viscosity is a measurement at 25° C.

Silicone compositions were determined for cure, peel force, retention of adhesion and pot life by the following tests.

Cure

An amount of a silicone composition was applied to a surface of a thin film or sheet substrate and heated in a hot air dryer at a predetermined temperature (120° C.) to form a cured film. Cure is expressed by a curing time required until the coating was cured to such an extent that the coating was no longer smeared or stripped by rubbing with fingers several times.

Peel Force A

An amount of a silicone composition was applied to a surface of a thin film or sheet substrate and heated in a hot air dryer at a predetermined temperature (140° C.) to form a cured film. After separator aging at 25° C. for one day, a solvent type acrylic adhesive Oribain BPS-5127 (manufactured by Toyo Ink Mfg. K. K.) was applied to the surface of the cured film to a wet thickness of 130 μm and heat treated at 100° C. for 3 minutes. A sheet of quality paper having a basis weight of 64 g/m² was then attached to the treated surface. The resulting sample was aged for 20 hours at 25° C. and thereafter, cut into strips of 5 cm wide. With a tensile tester, the force (gram) required to peel the paper sheet from the sample strip was measured by pulling the paper sheet at an angle of 180° and a peel rate of 0.3 m/min. and 60 m/min.

Peel Force B

An amount of a silicone composition was applied to a surface of a thin film or sheet substrate and heated in a hot air dryer at a predetermined temperature (140° C.) to form a cured film. After separator aging at 25° C. for one day, an emulsion type acrylic adhesive Oribain BPW-3110H (manufactured by Toyo Ink Mfg. K. K.) was applied to the surface of the cured film to a wet thickness of 130 μm and heat treated at 100° C. for 3 minutes. A sheet of quality paper having a basis weight of 64 g/m² was then attached to the treated surface. The resulting sample was aged for 20 hours at 25° C. and thereafter, cut into strips of 5 cm wide. With a tensile tester, the force (gram) required to peel the paper sheet from the sample strip was measured by pulling the paper sheet at an angle of 180° and a peel rate of 0.3 m/min. and 60 m/min.

Retention of Adhesion

A cured film of silicone composition was formed on a substrate as in the peel test. A pressure-adhesive polyester tape (manufactured under the trade name of No. 31 tape by Nitto Denko K. K.) was attached to the surface of the cured film. With a load of 20 g/cm² rested thereon, the sample was aged for 20 hours at 70° C. The tape was stripped off and attached to a stainless steel plate. The tape was then peeled from the stainless steel plate at an angle of 180° and a peel rate of 0.3 m/min. A force F (grams) required for peeling was measured. As a blank test, a pressure-adhesive polyester tape was attached to a Teflon®-coated plate and similarly aged before a force $F_0$ (g) required for peeling the polyester tape from a stainless steel plate was measured. Percent retention of adhesion is given as $F/F_0$ x 100%.

Pot Life

Pot life was a time required for a silicone composition to gel at 45° C.

Example 1

A silicone composition was prepared by mixing 100 parts of a branched polysiloxane of formula (1) wherein R is methyl, a=2.4, b=0.3, and x=200, having a viscosity of 390 centipoise with 1.70 parts of a methylhydrogenpolysiloxane blocked with a trimethylsiloxy group at each end of a molecular chain and having a viscosity of 20 centipoise (SiH/SiCH=CH$_2$ ratio 1.6), adding 0.3 part of 1-ethynyl-1-cyclohexanol, and agitating them until the mixture became uniform. A platinum complex of a vinylsiloxane was then added to the mixture in such an amount as to give 100 parts of platinum per million parts of the dimethylpolysiloxane.

The silicone composition was applied to polyethylene laminated paper with a basis weight of 100 g/m² to a buildup of 0.6 to 0.7 g/m² using a RI-2 model printability tester (manufactured by AKIRA Mfg. K. K.). For a curing test sample, the coating was heated at 120° C. to form a cured film. For peel force and retention of adhesion test samples, the coating was heated at 140° C. for 30 seconds to form a cured film. The test results are shown in Table 1.

Example 2

A silicone composition was prepared as in Example 1 except that 100 parts of a branched polysiloxane of formula (1) wherein R is methyl, a=2, b=1, and x=150, having a viscosity of 230 centipoise was used instead of the branched polysiloxane used in Example 1, and the amount of the methylhydrogenpolysiloxane blended was changed to 1.85 parts (SiH/SiCH=CH$_2$ ratio 1.6). It was similarly tested for physical properties. The test results are also shown in Table 1.

Example 3

A silicone composition was prepared as in Example 1 except that 100 parts of a branched polysiloxane of formula (1) wherein R is methyl, a=1.7, b=1.3, and x=150, having a viscosity of 240 centipoise was used instead of the branched polysiloxane used in Example 1, and the amount of the methylhydrogenpolysiloxane blended was changed to 1.57 parts (SiH/SiCH=CH$_2$ ratio 1.6). It was similarly tested for physical properties. The test results are also shown in Table 1.

Example 4

A silicone composition was prepared as in Example 1 except that 100 parts of a branched polysiloxane of formula (1) wherein R is methyl, a=3, b=0, and x=200, having a viscosity of 390 centipoise was used instead of the branched polysiloxane used in Example 1, and the amount of the methylhydrogenpolysiloxane blended was changed to 2.13 parts (SiH/SiCH=CH$_2$ ratio 1.6). It was similarly tested for physical properties. The test results are also shown in Table 1.

Comparative Example 1

A silicone composition was prepared as in Example 1 except that 100 parts of a linear dimethylpolysiloxane blocked with a dimethylvinylsiloxy group at each end of a molecular chain and having a viscosity of 390 centipoise was used instead of the branched polysiloxane used in Example 1, and the amount of the methylhydrogenpolysiloxane blended was changed to 1.97 parts (SiH/SiCH=CH$_2$ ratio 1.6). It was similarly tested for physical properties. The test results are also shown in Table 1.

Comparative Example 2

A silicone composition was prepared as in Example 1 except that 100 parts of a branched polysiloxane consisting of 96.16 mol % (200 units) of Me$_2$SiO$_{2/2}$ units, 2.40 mol % (5 units) of Me$_2$ViSiO$_{1/2}$ units and 1.44 mol % (3 units) of MeSiO$_{3/2}$ units wherein Me is methyl and Vi is vinyl, bearing three T units (MeSiO$_{3/2}$ units) in a molecule and having a viscosity of 350 centipoise, and the amount of the methylhydrogenpolysiloxane blended was changed to 3.10 parts (SiH/SiCH=CH$_2$ ratio 1.6). It was similarly tested for physical properties. The test results are also shown in Table 1.

TABLE 1

|  | Curing time (sec.) | Retention of adhesion (%) | Peel force A (g/5 cm) 0.3 m/min. | Peel force A (g/5 cm) 60 m/min. | Pot life (hr.) |
| --- | --- | --- | --- | --- | --- |
| E1 | 20 | 95 | 15 | 180 | 30 |
| E2 | 15 | 94 | 20 | 150 | 26 |
| E3 | 20 | 90 | 16 | 160 | 28 |
| E4 | 15 | 97 | 30 | 190 | 27 |
| CE1 | 20 | 98 | 32 | 280 | 28 |
| CE2 | 13 | 97 | 49 | 160 | 19 |

Example 5

A silicone composition was prepared by mixing 100 parts of a branched polysiloxane of formula (1a) wherein R is methyl and k+m+n=160, having a viscosity of 250 centipoise with 2.7 parts of the methylhydrogenpolysiloxane used in Example 1 (SiH/SiCH=CH$_2$ ratio 1.6), adding 0.3 part of 1-ethynyl-1-cyclohexanol, and agitating them until the mixture became uniform. A platinum complex of a vinylsiloxane was then added to the mixture in such an amount as to give 200 parts of platinum per million parts of the dimethylpolysiloxane.

As in Example 1, the silicone composition was applied to polyethylene laminated paper to a buildup of 0.6 to 0.7 g/m$^2$. For a curing test sample, the coating was heated at 120° C. to form a cured film. For peel force and retention of adhesion test samples, the coating was heated at 140° C. for 30 seconds to form a cured film. The test results are shown in Table 2.

Example 6

A silicone composition was prepared as in Example 5 except that 100 parts of a branched polysiloxane of formula (1a) wherein R is methyl and k+m+n=100, having a viscosity of 130 centipoise was used instead of the branched polysiloxane used in Example 5, and the amount of the methylhydrogenpolysiloxane blended was changed to 4.0 parts (SiH/SiCH=CH$_2$ ratio 1.6). It was similarly tested for physical properties. The test results are also shown in Table 2.

Example 7

A silicone composition was prepared as in Example 5 except that 100 parts of a branched polysiloxane of formula (1a) wherein R is methyl and k+m+n=300, having a viscosity of 870 centipoise was used instead of the branched polysiloxane used in Example 5, and the amount of the methylhydrogenpolysiloxane blended was changed to 1.5 parts (SiH/SiCH=CH$_2$ ratio 1.6). It was similarly tested for physical properties. The test results are also shown in Table 2.

Comparative Example 3

A silicone composition was prepared as in Example 5 except that 100 parts of a linear dimethylpolysiloxane blocked with a dimethylvinylsiloxy group at each end of a molecular chain and having a viscosity of 400 centipoise was used instead of the branched polysiloxane used in Example 5, and the amount of the methylhydrogenpolysiloxane blended was changed to 2.0 parts (SiH/SiCH=CH$_2$ ratio 1.6). It was similarly tested for physical properties. The test results are also shown in Table 2.

Comparative Example 4

A silicone composition was prepared as in Example 5 except that 100 parts of a branched polysiloxane of formula (1a) wherein R is methyl and k+m+n=500, having a viscosity of 6,500 centipoise was used instead of the branched polysiloxane used in Example 5, and the amount of the methylhydrogenpolysiloxane blended was changed to 1.0 parts (SiH/SiCH=CH$_2$ ratio 1.6). It was similarly tested for physical properties. The test results are also shown in Table 2.

TABLE 2

|  | Curing time (sec.) | Retention of adhesion (%) | Peel force B (g/5 cm) 0.3 m/min. | Peel force B (g/5 cm) 60 m/min. |
| --- | --- | --- | --- | --- |
| E5 | 10 | 96 | 34 | 180 |
| E6 | 8 | 98 | 35 | 135 |
| E7 | 15 | 97 | 28 | 215 |
| CE3 | 20 | 98 | 34 | 285 |
| CE4 | 50 | 81 | 25 | 450 |

Example 8

A silicone composition was prepared by mixing 100 parts of a branched polysiloxane of formula (1a) wherein R is methyl and k+m+n=200, possessing one T unit and having a viscosity of 390 centipoise with 2.17 parts of the methylhydrogenpolysiloxane used in Example 1 (SiH/SiCH=CH$_2$ ratio 1.6), adding 0.3 part of 1-ethynyl-1-cyclohexanol, and agitating them until the mixture became uniform. A platinum complex of a vinylsiloxane was then added to the mixture in such an amount as to give 100 parts of platinum per million parts of the dimethylpolysiloxane.

The silicone composition was examined for pot life. It was also examined for flow by a test to be mentioned later. The test results are shown in Table 3.

Comparative Example 5

A silicone composition was prepared as in Example 8 except that 100 parts of a branched organopolysiloxane consisting of 96.16 mol % (200 units) of $Me_2SiO_{2/2}$ units, 2.40 mol % (5 units) of $Me_2ViSiO_{1/2}$ units and 1.44 mol % (3 units) of $MeSiO_{3/2}$ units wherein Me is methyl and Vi is vinyl, bearing three T units ($MeSiO_{3/2}$ units) in a molecule and having a viscosity of 350 centipoise, and the amount of the methylhydrogenpolysiloxane blended was changed to 3.1 parts ($SiH/SiCH=CH_2$ ratio 1.6). It was similarly tested for physical properties. The test results are also shown in Table 3.

Comparative Example 6

A silicone composition was prepared as in Example 8 except that 100 parts of a T unit-free linear dimethylpolysiloxane blocked with a dimethylvinylsiloxy group at each end of a molecular chain and having a viscosity of 400 centipoise was used instead of the branched polysiloxane used in Example 8, and the amount of the methylhydrogenpolysiloxane blended was changed to 2.0 parts ($SiH/SiCH=CH_2$ ratio 1.6). It was similarly tested for physical properties. The test results are also shown in Table 3.

Flow

Using a gravure offset silicone applicator (manufactured by Teijin Seiki K. K.) having a top roll (T), an offset roll (O) and a gravure roll (G) arranged in serial contact, a silicone composition was coated. With the speed ratio (O/T) of the offset roll to the top roll kept constant, the speed ratio (G/T) of the gravure roll to the top roll was adjusted so as to provide an identical buildup at different line speeds of 20 m/min., 45 m/min., and 70 m/min.

Japanese Patent Application No. 180038/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An organic solventless curable silicone release composition comprising;

(A) 100 parts by weight of a branched organopolysiloxane of the following formula (1):

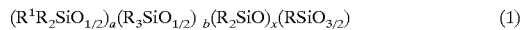

wherein $R^1$ is a vinyl group, each R is independently a monovalent hydrocarbon group free of an aliphatic unsaturated bond, letters a and b are numbers satisfying $1.5 \leq a \leq 3.0$, $0 \leq b \leq 1.5$, a+b=3, and x is a number within the range: $50 \leq x \leq 400$, said organopolysiloxane having a vinyl group attached to a silicon atom at an end of its molecular chain, (B) 0.5 to 10 parts by weight of an organohydrogenpolysiloxane having at least three hydrogen atoms each attached to a silicon atom in a molecule, and (C) a catalytic amount of a platinum group metal catalyst, the cured product having a peel force of 15 to 35 g/5 cm at an angle of 180° and a peel rate of 0.3 m/min and a peel force of 135 to 215 g/5 cm at an angle of 180° and a peel rate of 60 m/min.

2. The composition of claim 1 wherein said organopolysiloxane (A) is of the formula (1a):

TABLE 3

|  | | Line speed 20 m/min. | | | Line speed 45 m/min. | | | Line speed 70 m/min. | | |
| --- | --- | --- | --- | --- | --- | --- | --- | --- | --- | --- |
|  | Pot life (hr.) | G/T (%) | O/T (%) | Buildup (g/m²) | G/T (%) | O/T (%) | Buildup (g/m²) | G/T (%) | O/T (%) | Buildup (g/m²) |
| E8 | 27 | 17.3 | 93.9 | 0.83 | 16.0 | 93.8 | 0.85 | 14.6 | 93.8 | 0.84 |
| CE5 | 19 | 14.9 | 94.0 | 0.85 | 10.0 | 93.9 | 0.80 | 8.5 | 93.8 | 0.82 |
| CE6 | 28 | 15.5 | 94.0 | 0.82 | 14.4 | 93.9 | 0.86 | 13.3 | 93.8 | 0.87 |

It is evident from Table 3 that the composition prepared in Comparative Example 5 using the organopolysiloxane having three T units requires a greater change of G/T as the line speed increases with the O/T kept constant, which means that the composition becomes less flowing and difficult to control the coating process at a higher line speed. As compared with the composition prepared in Comparative Example 6 using the T unit-free linear organopolysiloxane, the composition prepared in Example 8 using the organopolysiloxane having one T unit exhibits equivalent flow and hence, offers equivalent ease of application at high speeds. As to the pot life, the composition of Example 8 had as long a gelling time as Comparative Example 6 in contrast to Comparative Example 5, indicating that the inclusion of one T unit does not reduce the pot life.

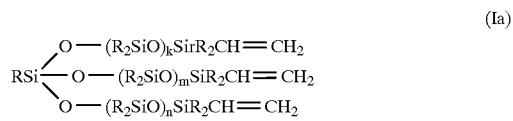

wherein R is as defined above, letters k, m and n are 0 or positive integers satisfying $50 \leq k+m+n \leq 400$.

3. A release sheet having formed thereon a cured coating of the composition of claim 1.

4. A release sheet having formed thereon a cured coating of the composition of claim 2.

5. The composition of claim 1, wherein the composition is free from an organic solvent.

6. The composition of claim 1, wherein in formula (1), each R is independently an optionally halogen-substituted alkyl group, phenyl or tolyl group, of 1 to 10 carbon atoms.

7. The composition of claim 1, wherein in formula (1), more than 80 mol % of the R groups are methyl.

8. The composition of claim 1, which contains at least one organopolysiloxane of the formula (1a):

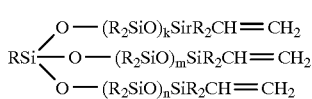

(Ia)

wherein R is as defined above, letters k, m and n are 0 or positive integers satisfying k+m+n=x, that is, $50 \leq k+m+n \leq 400$.

9. The composition of claim 1, wherein the organopolysiloxanes of formula (1) in the composition have, on average, 1.5 to 2.7 of their three molecular chain ends provided with a vinyl group attached to a silicon atom.

10. The composition of claim 1, wherein the organopolysiloxane has a viscosity of 50 to 2000 centipoise at 25° C.

11. The composition of claim 1, wherein the organohydrogenpolysiloxane, (B), is of the formula (2):

$$R^2_c H_d SiO_{(4-c-d)/2} \qquad (2)$$

wherein $R^2$ is a substituted or unsubstituted monovalent hydrocarbon group and letters c and d are positive numbers satisfying $c+d \leq 3$.

12. The composition of claim 1, wherein in formula (2), each $R^2$ is independently an optionally halogen-substituted alkyl group, phenyl or tolyl group, of 1 to 10 carbon atoms.

13. The release sheet of claim 3, which comprises a paper substrate having a cured coating of the composition thereon.

14. The release sheet of claim 3, which comprises a plastic film substrate having a cured coating of the composition thereon.

* * * * *